United States Patent [19]
Yang

[11] Patent Number: 5,476,293
[45] Date of Patent: Dec. 19, 1995

[54] ELECTRIC ENERGY STORAGE AND DISTRIBUTION SYSTEM OF DIFFERENTIAL DISTRIBUTION TYPE

[76] Inventor: Tai-Her Yang, No. 32 Lane 29, Taipin St., Si-Hu Town, Dzan-Hwa, Taiwan

[21] Appl. No.: 192,626

[22] Filed: Feb. 7, 1994

[51] Int. Cl.⁶ .............................. H02P 9/00; F16H 37/08
[52] U.S. Cl. .................. 290/4 C; 290/4 R; 290/43; 290/54; 322/9; 322/40
[58] Field of Search .................................. 290/4 R, 4 C, 290/6, 43, 54; 322/9, 40

[56] References Cited

U.S. PATENT DOCUMENTS

| | | | |
|---|---|---|---|
| 832,622 | 10/1906 | Del Proposto | 290/4 C |
| 2,597,357 | 5/1952 | McCormick | 290/4 R |
| 2,688,704 | 9/1954 | Christenson | 290/4 C |
| 3,732,751 | 5/1973 | Berman et al. | 290/4 C |
| 3,974,396 | 8/1976 | Schönball | 290/54 |
| 4,488,053 | 12/1984 | Cronin | 290/4 C |

Primary Examiner—A. D. Pellinen
Assistant Examiner—Robert Lloyd Hoover
Attorney, Agent, or Firm—Bacon & Thomas

[57] ABSTRACT

An electric energy storage and distribution system for a fluid-driven propeller, the propeller being connected to drive an AC generator, includes a planetary gear system by means of which rotation of the propeller is transferred to the AC generator motor, via a ring gear and a sun gear attached to a DC generator/motor, the DC generator/motor being connected to a battery. When the speed of the propeller is insufficient to drive the AC generator at a desired frequency and voltage, the DC motor is driven by the battery to either assist rotation of the propeller or the propeller can be braked such that the DC motor alone drives the AC generator. When an excess propeller speed is obtained, the propeller drives both the AC generator and the DC generator, the DC generator charging the battery. Conversely, when excess power is available through the power grid, the AC generator can be used as a motor to drive the DC generator via the ring gear, planetary gear, and sun gear to charge the battery.

1 Claim, 1 Drawing Sheet

ELECTRIC ENERGY STORAGE AND DISTRIBUTION SYSTEM OF DIFFERENTIAL DISTRIBUTION TYPE

SUMMARY OF THE INVENTION

The present invention uses a differential type electric energy storage and distribution system which effectively absorbs excess mechanical energy and turns it into electrical energy for storage during off-peak times and distribution as needed. The system includes an AC generator and a D.C. motor/generator which serves as a D.C. generator for charging a battery to store excess energy and as a D.C. motor to drive the AC generator when required. When used as a D.C. generator, the D.C. motor/generator can be driven through planetary gears and a sun gear by either a propeller or the A.C. generator, which can also serve as an A.C. motor. Conversely, the A.C. generator can either be powered by the propeller alone, the D.C. motor driven by the battery, or a combination of the two.

DETAILED DESCRIPTION OF THE INVENTION

Figure 1:
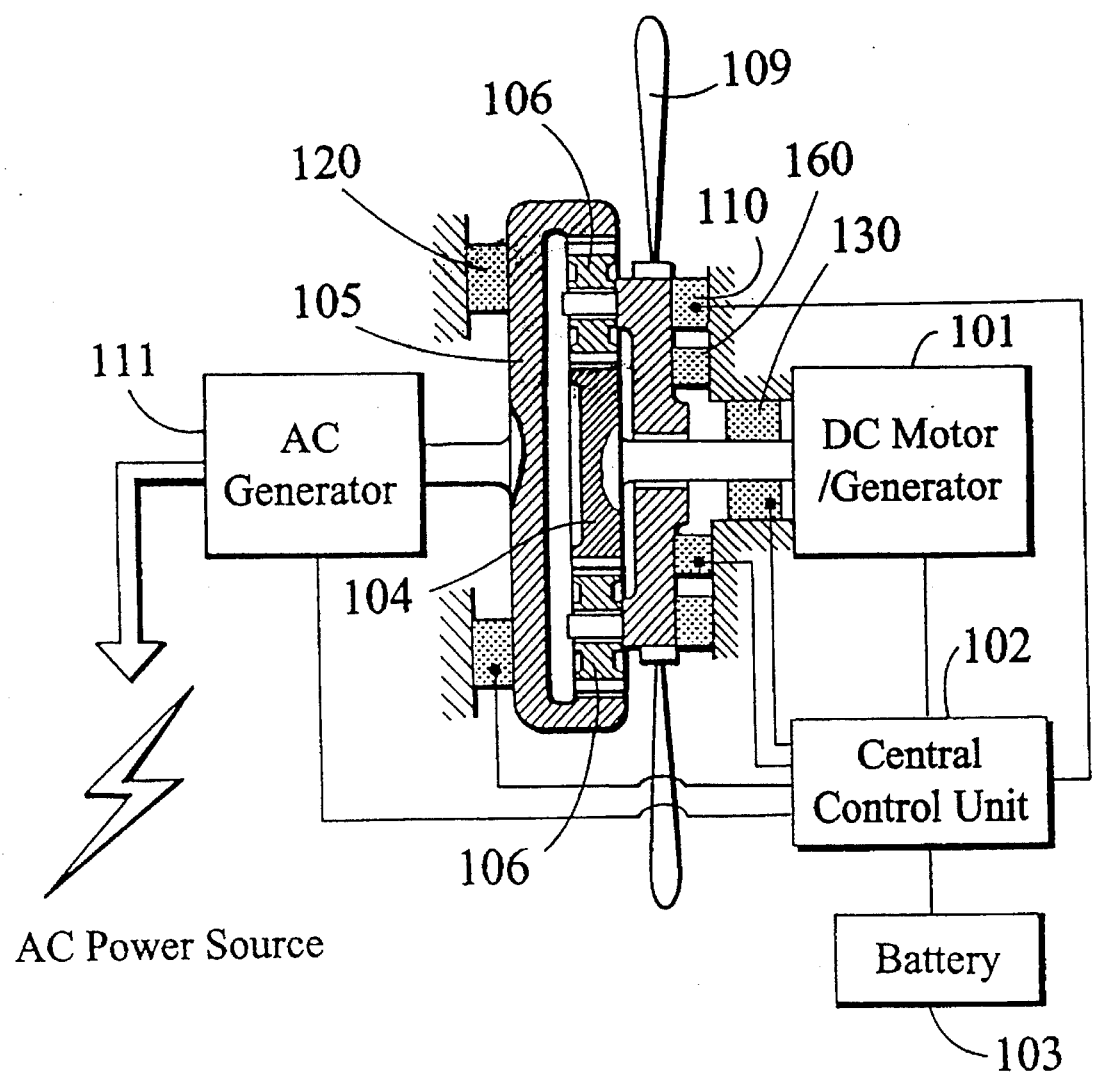
FIG. 1 is a schematic view of a differential distribution type electric energy storage and distribution system.

Traditionally, a rotating or revolving mechanism is used to change unstable energy sources into electric power. The traditional sources include small and medium power sources such as wind, sea current, tidal, wave, river, and stream forces. Such unstable intermittent energy with suddenly expanding energy peaks and energy valleys is difficult for present generating devices to absorb.

The main object of the present invention is to overcome the defects of traditional electrical energy storage and distribution systems of the above-mentioned type by using a rotating propeller to store mechanical energy which has been converted from fluid energy. The invention includes an A.C. motor/generator, a storage battery, and a D.C. motor/generator. The propeller has an auxiliary braker and rotational speed detector, and the (AC motor/generator, battery, and DC motor/generator) are linked by a planetary gear set and are controlled by a central control unit (CCU) in the following way:

(1) When the speed of the propeller is too low or zero, an auxiliary driving braker can be used to stop the propeller, and the frequency of the subscribers' electric power can be maintained by means of battery, which drives a the D.C. motor/generator, the D.C. motor/generator in turn transmitting power to a A.C. motor/generator through a differential gear;

(2) Alternatively, if the driving rotary speed needed for the A.C. motor/generator operating as an A.C. generator is insufficient, a desired frequency of the A.C. motor/generator and a voltage value may be input to the CCU, which can control the D.C. motor/generator operating as an A.C. generator through a differential gear set and the energy provided by the battery so as to make the combined rotary speed of the propeller and D.C. motor/generator reach a rotary speed sufficient to cause the A.C. motor/generator to produce electricity at the desired frequency;

(3) When the rotary speed of the propeller is faster, the braker of the D.C. motor/generator side can be operated to transmit maximum power from the propeller to the A.C. motor/generator and thereby transfer a maximum current to an A.C. power grid or network, or to simultaneously drive the A.C. motor/generator and the D.C. motor/generator, causing the D.C. motor/generator to charge the battery. Alternatively, when the propeller is over-driven, while still driving the A.C. motor/generator and D.C. motor/generator simultaneously, the propelling angle can also be changed in a traditional way, or a damper composed of fluid force, mechanic force, or magnetic current can be activated so as to inhibit the overflow driving.

As illustrated in FIG. 1, the structure of the differential type electric energy storage and distribution system includes the following elements:

The first element is a D.C. motor/generator 101 in the form of a conventional constant magnetic or excitation coil type D.C. motor, which can be switched to be a D.C. generator by means of the control of the CCU 102. When motor/generator 101 is used as a D.C. generator, it can receive the mechanical energy provided by a differential gear 106 to produce D.C. energy for charging the battery 103. When motor/generator 101 is used as a D.C. motor, it can receive power from the storage battery through the control of CCU 102 so as to drive the A.C. generator 111 through differential gear 106.

CCU 102 is in the form either of electromechanical of solid state electronic switching elements arranged to carry out the following operations:

(1) when the D.C. motor/generator 101 is used as a generator to charge battery 103, CCU 102 switches the connecting line to cause the generator output to be input to the battery;

(2) when the D.C. motor/generator 101 is used as a motor to act as an auxiliary driving device to help drive the A.C. generator at the generating frequency of the A.C. generator, CCU 2 controls the load current of the motor and the rotary speed signal of the propeller based on the amount of deficiency in its speed determined by feedback from propeller speed detecting device 160 so as to control the D.C. motor speed;

(3) CCU 102 also can be used to control the excitation magnetism of the A.C. motor/generator so as to control its generating voltage and the load adjusting ratio;

(4) braker 120 of the control A.C. generator side and braker 130 of the D.C. motor/generator side are controlled by CCU 2 through the propeller;

(5) the propelling angle adjustment of the control is also controlled by CCU 102, and a damper for rotary over speed may also be similarly controlled by CCU 102;

(6) Finally, CCU 2 controls the braker 110 of the propeller to stop the propeller, allowing the system to switch from driving the A.C. motor/generator by means of the D.C. motor/generator to driving the D.C. motor/generator to charge a battery through the input of A.C. energy from the A.C. power network or grid so as to use the A.C. motor/generator as a motor to drive the D.C. motor/generator;

The next element of the preferred system is a differential gear set, including an output/input shaft sun gear 104, outer ring output/input gear 105, connected to a shaft of A.C. motor/generator 111 and a circulating gear composed of planetary gears 106 which revolve around a central axis of the gear set when the propeller rotates, the propeller forming the carrier for the planetary gears 106 with the rotational axis of the propeller coinciding with the central axis of the gear set, the planetary gears also rotating around their own axes in response to sun gear rotation, subject to braking of any input/output gear, which causes more power to be transmitted to a different input/output gear.

In the preferred system, A.C. motor/generator 111 can either be driven by the differential gear to produce A.C. energy, the voltage value and frequency of the generator 111 being fed back simultaneously to CCU 102 to allow control thereby, or it can be used as a synchronous motor to receive the driving operation of a subscribers' A.C. electricity input and thereby drive the D.C. motor/generator through gears 104–106.

Finally, propeller 109, which is used for providing mechanical energy driven by wind force or fluid force to transmit power to the differential gear set may further include a pitch-changing control device (not shown) controlled by the CCU 102, a braker 110, a rotary speed detecting device 160, and/or a rotary over-speed damper (not shown) activated by fluid force, mechanical force, or electromagnetic effects.

By means of the above-described preferred embodiment of the invention, (1) a weak motive force from the propeller-driving fluid body and the D.C. motor/generator rotating motive force from the electrolysis of a storage battery can be added to each other and combined to drive the A.C. motor/generator to operate as an A.C. generator; (2) when the fluid force is stronger, it can provide a higher efficiency to drive simultaneously the A.C. motor/generator to operate as an A.C. generator and D.C. motor/generator to operator as a D.C. generator to charge the battery by means of a differential gear set, and (3) when the A.C. motor/generator is in an off-peak period, it can operate as a synchronous motor to drive the D.C. motor/generator to be used as a D.C. generator to cause it to supply energy to the storage battery, thereby providing an improvement over the conventional system which uses a propeller shaft coupled to a single generator.

I claim:

1. An electrical energy storage and distribution system, comprising:

a propeller rotatable in response to an external source of mechanical energy;

an AC generator and a DC motor/generator, wherein the AC generator is mechanically connected to the propeller through a ring gear attached to a shaft of the AC generator and planetary gears rotatable about planetary gear axes fixed to the propeller, the planetary gear free to revolve around a sun gear, which in turn rotates around a central axis, the planetary gears thus revolving around the central axis as they rotate around respective said planetary gear axes, whereby when the sun gear is braked, all power from the propeller is transmitted to the AC generator via the planetary and ring gears; and wherein the DC motor/generator has a shaft attached to the sun gear such that, when the propeller is braked, rotation of the shaft is transmitted via the sun gear to the planetary gears, the ring gear and the AC generator, and such that when neither the shaft of the DC motor/generator nor the propeller is braked, power from both the DC motor/generator and propeller is transmitted to the AC generator, the rotation of the planetary gears about their own axes caused by rotation of the propeller and the revolution of the planetary gears about the central axis caused by rotation of the sun gear both contributing to rotation of the ring gear and therefore transmission of power to the AC generator, rotation of said ring gear and propeller also being capable of causing transmission of power through said planetary and sun gears to said DC motor/generator; and a battery for driving said DC motor/generator, said battery being connected to the motor/generator to receive a charging current from said motor/generator when said motor/generator is driven by said propeller or AC generator, said AC generator being capable of operating as an AC motor in response to excess capacity on a power grid to which the AC generator is connected, and to thereby drive said DC motor/generator in order to supply said excess capacity to the battery;

wherein when the speed of the propeller is greater than that necessary to generate a desired output from said AC generator, power is transmitted from the propeller through the planetary gears to both the ring gear and the sun gear to drive the AC generator at a desired frequency and voltage and to also drive the DC motor/generator to produce electricity to charge the battery; and when battery charging is not desired, the propeller is braked and the AC generator is driven exclusively by the DC motor/generator acting as a motor; and when the propeller speed is higher than a predetermined speed, the DC motor/generator acts as a DC generator to charge the battery; and wherein the AC generator also operates as it motor when supplied with power from the power grid to thereby drive the DC motor/generator via said gears to charge said battery.

* * * * *